Nov. 1, 1932.     C. H. WILSON     1,885,972
HARDNESS TESTING GAUGE
Filed April 16, 1930    2 Sheets-Sheet 2
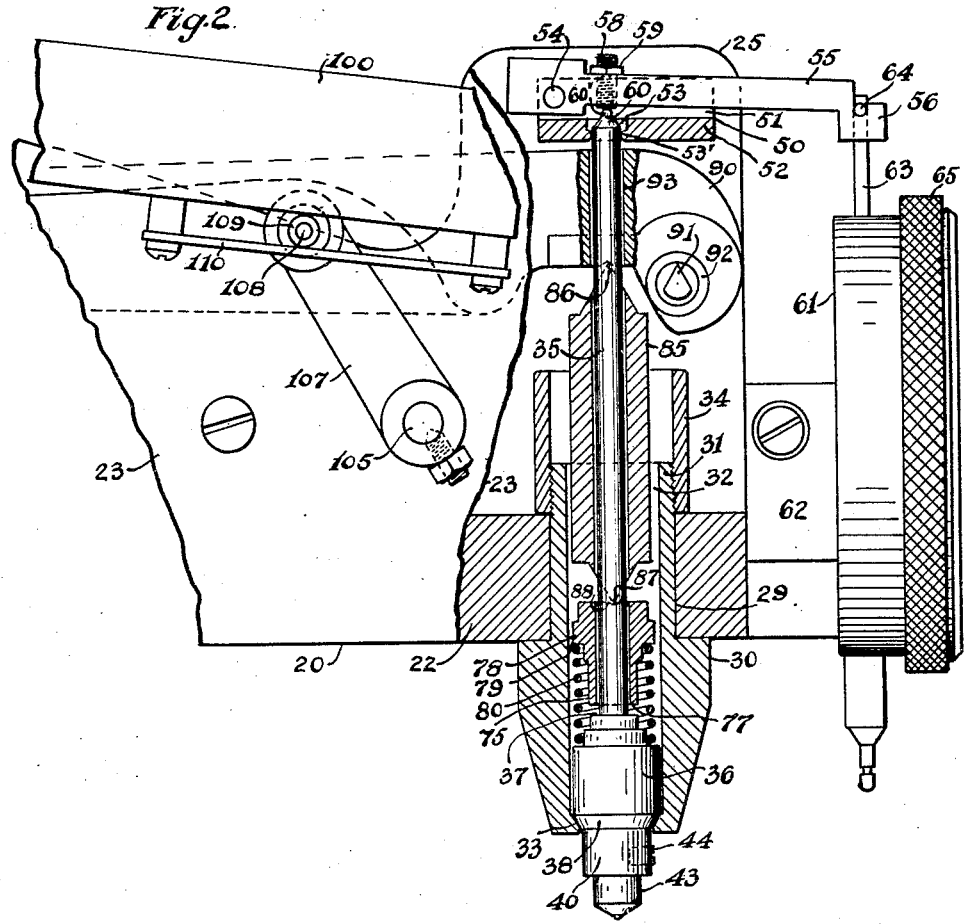
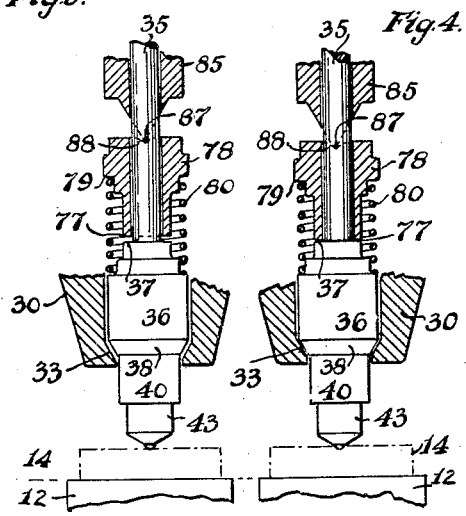
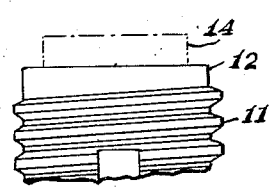
INVENTOR
Charles H. Wilson
BY
Harold D. Jenney  ATTORNEY Patented Nov. 1, 1932

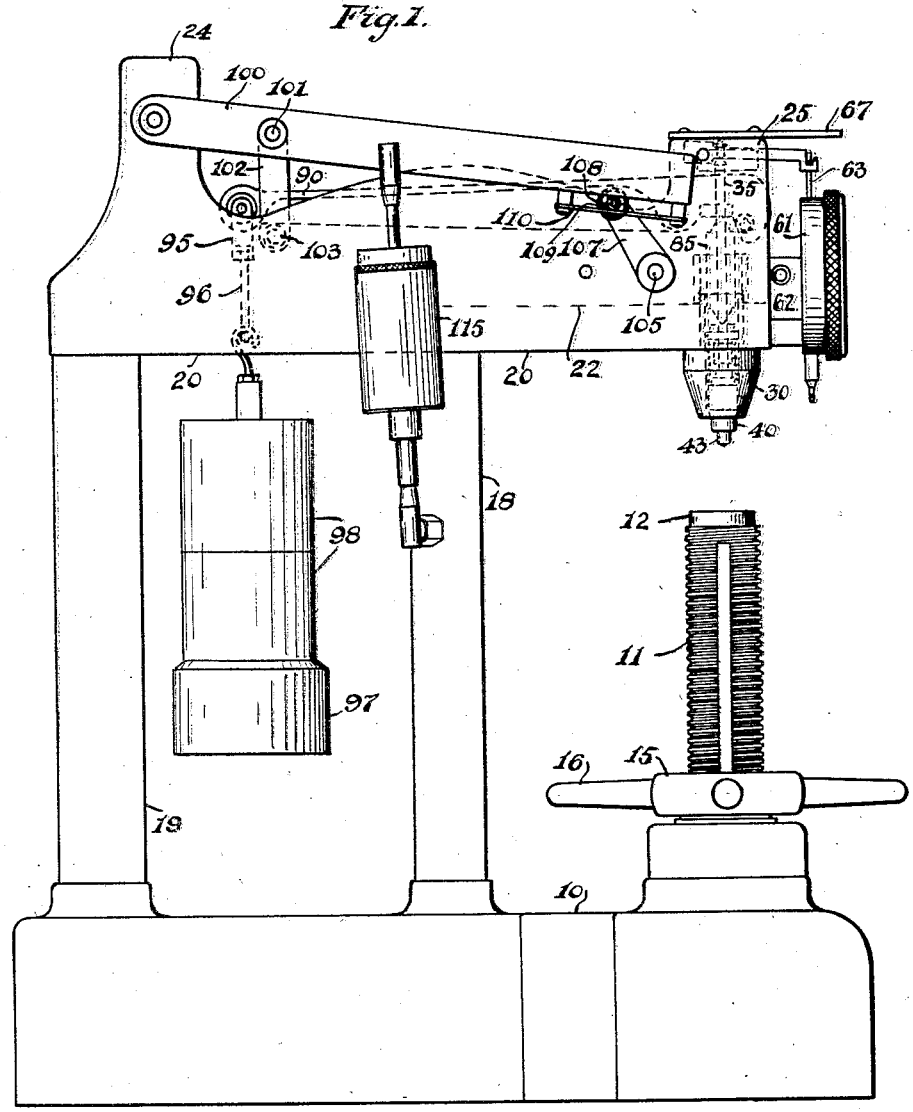

1,885,972

UNITED STATES PATENT OFFICE

CHARLES H. WILSON, OF PELHAM, NEW YORK, ASSIGNOR TO WILSON MECHANICAL INSTRUMENT CO. INC., OF NEW YORK, N. Y., A CORPORATION OF NEW YORK

HARDNESS TESTING GAUGE

Application filed April 16, 1930. Serial No. 444,726.

This invention relates to hardness testing machines and apparatus and more particularly to improvements in machines of the general type shown in the Rockwell Patents Nos. 1,516,207 and 1,516,208 both issued Nov. 18, 1924; though it is noted that the invention is not limited to hardness testing machines of this particular type.

The principal object of the invention is to provide an apparatus of this kind wherein friction such as would interfere with accurate testing is reduced to a minimum.

The inventive features for the accomplishment of this and other objects are shown herein in connection with an improved hardness testing machine which, briefly stated, includes a movable test-piece support, a testing head and means for causing relative approach between said support and head. A sleeve carried fast on the testing head is provided with a seat which normally supports a plunger member comprising a long rod or upper extension and a body, the latter engaging said seat only and constructed to carry a penetrator associated with said movable support. A bushing loose on said extension out of contact with the sleeve, and normally spaced from the plunger body is engaged by a minor load spring, between said plunger and body and normally holding said body and bearing member apart. A member fast on the testing head is provided with a transverse line shaft-supporting annulus having a rounded edge and receiving the end of said extension remote from the body thereby to support the upper end of the plunger member.

An intermediate tubular member on, and out of contact with, said extension has one end engaging the bushing.

A major load lever fulcrumed on said head and out of contact with said extension presses on the other end of said intermediate member thereby to press the bushing against the body.

Suitable means are provided for retracting the major load. An index member pressing on the outer end of said extension controls a suitable gauge.

In machines for testing or measuring the hardness of metals and other material, it has already been proposed to employ the principle of penetration and measurement of depth of penetration.

These known arrangements have been found faulty to some extent in precision and sensitivity, due to the presence of friction in the application of the minor and major loads applied in the hardness tests as in the machines of the patents above identified.

In the known arrangement, the plunger rod or member carrying the penetrator at one end and with provision for applying the penetrating load at the other end has been customarily guided, either by a long contacting tubular member, or by two or more short contacting tubular members or by a series of concentric members as in the above mentioned United States Patent No. 1,516,208.

These arrangements have disadvantages in that precision and sensitivity of the known machine are thus impaired.

According to this invention a technical progress is accomplished in the manner that all friction is overcome which was actually found to defeat the degree of sensitivity required, by designing the contacting surfaces between the plunger near the penetrator end, and the head of the machine so that said surfaces act as a guide to the plunger only when the penetrator is inoperative, or when not in contact with a specimen to be tested; but when the penetrator and plunger are in the testing or operative position, and continuing through the major load application, the plunger is free from contact with the machine structure, except at its upper end adjacent the point of load application and there only by transverse circumferential hair-line point engagement, and is guided at its lower end by the specimen or test piece contacting with the penetrating surface of the penetrating member.

Technical progress has been further accomplished in the manner of supplying the lower end of the plunger with an annular head made much smaller than the bore in its plunger sleeve to eliminate friction, and formed with a conical shoulder adapted to engage a conical surface of said bore, for centering the plunger prior to making a test, and for holding it rigid in the central position.

Heretofore in machines of this kind, undesired friction principally between the sleeve and plunger body, between the bushing and said extension, between the tubular intermediate member and the extension, and in other places, interfered with the proper movement of the plunger member on the application of the minor and major loads; and a particular object accomplished by the present invention is the elimination of this and other objectionable friction.

To this end I so construct the above stated parts that they are or will be out of contact as stated above and as will be explained hereinafter. Thus the apparatus is so constructed that when the test piece engages and raises the penetrator, but before the major load is applied, said plunger member is entirely out of contact with any other structure except the penetrator, the bushing, said minor load spring and said rounded edge. After the major load is applied, the plunger is out of contact with any other structure except the minor load spring, said bushing, and the penetrator. Thus frictional resistances and error are reduced to a minimum.

Other objects of the invention are to improve generally the simplicity and efficiency of such apparatus and to provide an apparatus of this kind which is economical, durable, reliable and very accurate in operation, and reasonably economical to manufacture.

Still other objects of the invention will appear as the description proceeds; and while herein details of the invention are described and claimed, the invention is not limited to these, since many and various changes may be made without departing from the scope of the invention as claimed in the broader claims.

While in this specification and claims mention is made of the bottoms, top, front and rear of the apparatus and it is stated that one part is moved toward the other rather than vice versa, it is understood that these words are used for designation and description, and that, for purposes of protection, they are to be construed broadly enough to cover other relative movements or positions than as shown, and in general the terms in the claims are to be given broad interpretation when possible for the purposes of protection.

In the accompanying drawings showing, by way of example, one of many possible embodiments of the invention, Fig. 1 is a side elevation of the apparatus;

Fig. 2 is a fragmental side elevation, partly in vertical section, showing the front end portion of the testing head;

Fig. 3 is a fragmental axial section, partly in elevation showing the plunger member and associated parts after the minor load is applied, but before the major load is applied; and Fig. 4 is a similar view showing the parts after the major load is applied.

This invention is shown as applied to a hardness tester machine supported on a base 10 carrying an elevating screw 11 mounted for vertical movement in the front end of the base and formed at its upper end into a support for an anvil or for carrying a test piece 14 (Fig. 4).

A capstan hand wheel 15 having threaded engagement on said screw is provided with radial pins 16 whereby the handwheel may be rotated to raise or lower the screw and work support.

Front and rear pillars 18, 19 on the middle and rear end of the base carry an elongated testing head 20 having its front end disposed over said support 12.

Said head is formed with a lower horizontal web 22 (Fig. 2) secured to said pillars and upstanding side wall flanges 23 extending substantially from end to end of the head and each provided at the respective ends with front and rear upward extensions 24, 25 (Fig. 1).

The forward end portion of said web has therein a vertical bore 29 receiving a plunger sleeve 30 having a reduced terminally threaded upper portion 31 fitted in said bore, and a large axial cylindrical bore 32 therethrough having at its lower end a small downwardly tapered seat or female conical portion 33 (Figs. 2 to 4).

An internally threaded lock ring 34 (Fig. 2) received on said threaded portion 31 and engaged with said web 22 holds the sleeve in place.

A plunger member 35, 36 comprises an upwardly pointed plunger rod or extension 35 and a lower cylindrical plunger body 36, the latter vertically movable in said sleeve 30 out of contact with the walls thereof and having an upper contact face 37 substantially perpendicular to the axis of the body. Said body 36 has a downwardly tapered annular shoulder or male conical portion 38 adapted to fit on said seat 33, and has a downward projection 40 provided with a downwardly opening bore and a lateral threaded perforation. A penetrator 43 received in said bore, and adapted to be engaged by test pieces raised thereto on said support, is held in place by a clamp screw 44 in the perforation.

Means are provided for laterally supporting the upper end of the plunger member 35, 36, and when the penetrator is raised, the plunger member is out of contact with any other structure except the penetrator, said supporting means and the minor load spring later to be described.

Said supporting means will now be described. A block 50 (Fig. 2) mounted between said upward extensions and having upturned ends 51 secured to said front upward extensions 25 has a horizontal intermediate portion 52 having a large opening 53 having its lower portion formed into a supporting annulus of smaller diameter and provided with cross sectionally rounded edges 53' receiving the plunger rod 35 with an annular line of contact. The object of the rounded edge 53' of small diameter is to permit a slight leeway in shift of position of the penetrator end of the plunger member without causing any binding of the rod 35 in the opening or supporting annulus 53.

An index lever pin 54 transverse to the head passing through said upturned ends 51 and extensions 25 to the rear of the plunger rod pivotally carries an index lever or control member 55 projecting frontward of the head and provided with a bifurcated free end hook 56.

An adjusting screw 58 mounted in said lever and held by a jam nut 59 has its lower end provided with a center recess receiving a small steel ball 60' in the pointed upper end 60 of the plunger rod 35. During upward movement of the plunger member, the latter is supported entirely by the engagement of the upper end of the rod 35 with the edge 53' of the annulus or opening 53 and the engagement of the penetrator with the test piece.

A gauge 61 mounted on a block 62 on the front of said head 20 is provided with an upwardly projecting plunger 63 having a cross pin 64 received on said end hook 56. The gauge has a manually rotatable bezel 65 carrying the dial and scale of the gauge, whereby the needle may be zeroized, when the movement of the needle is brought about during the application of the minor load.

A shield 67 mounted on said front extensions is disposed on the lever and gauge.

Now will be described means for applying the minor and major loads when the test piece is raised.

A bushing or pressure member 75 loosely movable on said rod 35 normally just above the plunger body has a lower face 77 perpendicular to its axis adapted at times to rest on said contact face 37.

Said bushing has an intermediate cylindrical enlargement 78 larger in diameter than said body, but at all times out of contact with the sleeve 30. The enlargement 78 provides an annular shoulder 79 around the bushing; and a minor load spring 80 is interposed between the plunger body and said shoulder 79, normally holding the plunger body and bushing somewhat spaced apart.

A tubular double-wedge knife-edge intermediate member 85 received on the plunger out of contact therewith and with the sleeve 30 is provided at its ends respectively with upper and lower diametric knife edges 86, 87 transverse to said head, the lower edges 87 resting in indentations 88 on the top face of said bushing 75.

A major load power lever 90, disposed longitudinally of and substantially between said walls, is provided at its front end with lateral knife-edge fulcrum members 91 having upper fulcrum edges engaging in axially alined bearing sleeves 92 mounted in the respective side walls of the head forward of the plunger rod.

The front end portion of the power lever near said fulcrum members rests on said upper knife edges 86 of the tubular member 85 and has a vertical bore 93 receiving said plunger rod 35 without contact therewith.

A link 95 (Fig. 1) pivotally hanging on the rear end of the power lever 90 carries a hanger rod 96 carrying a pan 97 at its lower end on which are disposed major load weights 98.

A lifting lever 100 (Fig. 1) pivoted to one of the rear upward extensions 24 is disposed exteriorly of and longitudinal to the head 22 and terminates near the front end of the head, and, over the rear end portion of the power lever, carries a laterally projecting lifting pin 101 carrying a link 102 provided with a roller 103 engaging under the power lever 90.

A spindle 105 passing through the head 20 under the forward part of the power lever carries a handle crank (not shown) fast on one end, and a crank arm 107 (Fig. 2) fast on the other end, the latter being provided with a lifting pin 108 carrying a roller 109 engaged under the lifting lever, whereby operation of the handle crank to forward direction may move the lifting pin substantially to its dead center and raise the lifting and power levers and hold them in raised position while the test piece is being slowly raised against the penetrator to raise the penetrator and plunger body until the plunger body leaves the seat 33 and the plunger body is almost in contact with the bushing, thus compressing the minor load spring and applying the minor load.

Movement of the handle rearwardly permits the power lever to lower and press down the double-knife edge member 85, thereby to press the bushing 75 against the plunger body, thus applying the major load and forcing the penetrator into the test piece.

A guide strip 110 secured fast on, and spaced from, the lifting lever retains the roller 109 adjacent to the lifting lever during movement of the handle crank in the opposite direction, permitting the lifting lever to lower.

A dash pot 115 (Fig. 1) comprises a cylinder and piston respectively connected to said front pillar and lifting lever respectively. The piston is valved to permit quick raising of the lifting lever and to retard its downward movement.

It is noted that when the plunger body is raised and disengaged from its seat 33, nothing touches the plunger member 35, 36 between the penetrator and the edge 53' of the supporting annulus 53 except the bushing 75 and spring 80. Therefore, the plunger member when thus disengaged is, before the major load power lever is lowered, entirely out of contact with the seat 33, sleeve 30, tubular member 85, and out of contact with any other structure except the edge 53' of the annulus 53, the penetrator and said minor load spring, and after the major load is applied, is out of contact with any other structure except the minor load spring, the bushing, and the control member screw.

From the foregoing, the operation will be obvious to those skilled in this art, and now need be summarized only briefly as follows:

The handle lever having been previously pulled forward until the pin 108 (Fig. 2) is at its forward limit, and the major load thus withdrawn, the test piece of which the hardness is to be tested is placed upon the support 12 or anvil and is raised until it gently engages the penetrator 43 and slowly raises the plunger 35, 36 approximately to the position of Fig. 3 and until the gauge pointer is approximately upright, with the female and male conical portions 33 and 38 separated and the cylindrical portion 36 of the plunger spaced from the walls of the bore 32 of the sleeve 30.

This applies the predetermined force of the minor load spring, and the bezel and scale of the gauge are then turned until the pointer indicates zero or some other predetermined initial point.

At this time nothing touches the plunger, except the penetrator 43, which is rigidly secured thereto, the spring 80, the bushing 75, the screw 58, and the edge 53' of the annulus 53; and nothing touches the penetrator except that its point is engaged by the test piece. Thus the plunger is entirely relieved of practically all frictional contact and the force of the spring 80 is with extreme accuracy carried to the penetrator point.

The crank handle and the pin 108 are next pushed back until they start to travel of themselves. This releases the lever 100 and the power lever 90, applying the major load through the tubular member 85 to the bushing 75, and presses the bushing face 77 against the plunger face 37, so that the whole major load is carried by the plunger and the penetrator point is pressed into the test piece, causing the penetrator to move a certain distance into the test piece, depending upon the hardness of the test piece, the parts then occupying the position of Fig. 4.

The major load is then removed by a frontward movement of the handle crank, after which the gauge reading is taken and the hardness number ascertained.

The enlarged portion 78 of the bushing is small enough in diameter to remain at all times out of contact with the sleeve 30. When the face 77 of the bushing is pressed against the face 37 of the plunger body, since these faces are perpendicular to the axes of the bushing and plunger member, the bushing always sits exactly upright when seating on the face 37, the bushing and the plunger member becoming practically one piece, but spaced from each other.

It will be understood from the foregoing description that the annular supporting bead-like edge 53' of the annulus 53, is not intended to function as a guide, in its true sense, for the plunger rod 35, said edge functioning rather only as a support against lateral movements of said plunger, so that said annulus may be termed as a support, but the term "guide" to designate the annulus 53, has been employed in some of the claims.

I claim as my invention:

1. In a hardness tester, a plunger member adapted to carry a penetrator; supporting means extremely remote from the penetrator engaging a transverse circumferential line portion only of said member; said member when moved by the penetrator being guided solely by the penetrator and said supporting means.

2. In a hardness tester, a plunger member adapted to carry a penetrator; circular but not cylindrical supporting guide means remote from the penetrator; said member when moved by the penetrator being guided solely by the penetrator and said supporting means.

3. In a hardness tester, a test-piece support; a seat; an elongated plunger member adapted to carry a penetrator and normally engaging said seat; a pressure member; a minor load means normally yieldably tending to press the plunger member in the direction of the penetrator; means for effecting relative approach between said support and seat to cause the test piece to engage the penetrator and disengage the plunger member from the seat against the pressure of the minor load means; a major load device adapted to press the pressure member against the plunger member; guide means engaging the plunger member at a limited part only remote from the penetrator.

4. In a hardness tester, a test-piece support; a seat; an elongated plunger member adapted to carry a penetrator and normally engaging said seat; a pressure member; a minor load means normally yieldably tending to press the plunger member in the direction of the penetrator; means for effecting relative approach between said support and seat to cause the test piece to engage the penetrator and disengage the plunger member from the seat against the pressure of the minor load means; a major load device adapted to press the pressure member against the plunger member; guide means engaging the plunger member at a limited part only remote from the penetrator; said pressure member and said plunger member being normally out of contact with other structure except said seat, said minor load means and said guide means.

5. In a hardness tester, a test-piece support; a seat; an elongated plunger member adapted to carry a penetrator and normally engaging said seat; a pressure member; a minor load means normally yieldably tending to press the plunger member in the direction of the penetrator; means for effecting relative approach between said support and seat to cause the test piece to engage the penetrator and disengage the plunger member from the seat against the pressure of the minor load means; a major load device adapted to press the pressure member against the plunger member; guide means engaging the plunger member at a limited part only remote from the penetrator; said pressure member and said plunger member, when the plunger member is thus disengaged, being, before the major load is applied, entirely out of contact with other structure except said guide means, the penetrator and said minor load means.

6. In a hardness tester, a test-piece support; a seat; an elongated plunger member adapted to carry a penetrator and normally engaging said seat; a pressure member; a minor load means normally yieldably tending to press the plunger member in the direction of the penetrator; means for effecting relative approach between said support and seat to cause the test piece to engage the penetrator and disengage the plunger member from the seat against the pressure of the minor load means; a major load device adapted to press the pressure member against the plunger member; guide means engaging the plunger member at a limited part only remote from the penetrator; said pressure member and said plunger member, when the plunger member is thus disengaged, being, after the major load is applied, out of contact with any other structure except the minor load means, said guide means and the penetrator.

7. In a hardness tester, a test-piece support; a seat; an elongated plunger member adapted to carry a penetrator at one end and normally engaging said seat near said end; a pressure member loosely carried on said plunger member; a minor load means normally yieldably tending to press the plunger member in the direction of the penetrator; means for effecting relative approach between said support and seat to cause the test piece to engage the penetrator and disengage the plunger member from the seat against the pressure of the minor load means; a major load device adapted to press the pressure member against the plunger member; guide means engaging the plunger member at the end part only at the end remote from the penetrator; said pressure member and said plunger member forming an assembly normally entirely out of contact with other structure except said seat, said minor load means and said guide means; said assembly when the plunger member is thus disengaged, being, before the major load is applied, entirely out of contact with other structure except said guide means, the penetrator and said minor load means, and being, after the major load is applied, out of contact with any other structure except the minor load means, said guide means and the penetrator.

8. In a hardness tester, a movable test-piece support; a testing head; a plunger member comprising a plunger extension, and a body movable on said head and adapted to carry a penetrator; a pressure member; a minor load means normally yieldably holding said body and pressure member apart; an intermediate member engaging the pressure member; a major load device adapted to press on said intermediate member to press the pressure member against the body; and an index control member pressing on the outer end of said extension; said intermediate member being out of contact with any other structure except said device and pressure member.

9. In a hardness tester, a test-piece support; a testing head; a plunger-receiving sleeve fast on said head and alined with said support, and having an inner seat; means for effecting relative movement of the head and support toward each other; a plunger member comprising a plunger rod and a body, the latter movable in said sleeve out of contact having knife-edge ends, one end engaging adapted to engage said seat; said body being constructed to carry a penetrator pointing toward said support; a bushing loose on said rod out of contact with the sleeve and normally spaced from the plunger body; a minor load spring normally holding said body and bushing apart; a tubular member on, and out of contact with, the rod, said member having knife-edge ends, one end engaging the plunger body; a major load device pressing on the other end of said tubular member out of contact with said rod; means for retracting the major load device; an index lever fulcrumed on said frame and actuated by said rod; and a gauge on said head controlled by the index lever.

10. In a hardness tester, a test-piece support; a testing head; a plunger member carried on said head adapted to carry a penetrator; a pressure member; a yieldable minor load means interposed between said pressure member and the plunger member; an intermediate member engaging the pressure member; a major load device adapted to press on said intermediate member to press the pressure member against the body; said intermediate member engaging being out of contact with any other structure except said device and pressure member.

11. In a hardness tester, a test-piece support; a seat support carrying a seat; a plunger member comprising an extension and a body, the latter being adapted to carry a penetrator and normally engaging said seat; a pressure member; a minor load means normally yieldably holding said plunger member and said pressure member slightly spaced apart; a major load device adapted to cause the pressure member to press against the plunger member; an index control member engaging the extension; and means for effecting relative approach between said support and seat to cause the test piece to engage the penetrator and cause said body to approach the pressure member; said pressure member being at all times entirely out of contact with said seat support.

12. In a hardness tester, a frame; a test-piece support movable on said frame; a plunger sleeve fast on said frame alined with the path of said support, and having a seat tapered toward the support; a plunger member comprising a plunger rod and a body, the latter movable in said sleeve out of contact therewith and having a tapered shoulder adapted to fit said seat, and a projection constructed to carry a penetrator pointing toward said support; a bushing loose on said rod at all times out of contact with said sleeve and normally spaced from the plunger body; a minor load spring normally holding said body and bushing apart; a tubular member on, and out of contact with, the rod one end engaging the bushing; a major load device pressing on the other end of said tubular member out of contact with said rod; means for lifting the major load; guide means guiding the upper end portion only of the rod; an index lever fulcrumed on said frame and engaging said rod; and a gauge on the frame and controlled by the index lever.

13. In a hardness tester, a frame; a test-piece support on said frame; a plunger sleeve on said frame alined with said support, and having a seat tapered toward the support; a plunger member comprising a plunger rod and a body, the latter movable in said sleeve out of contact therewith and having a tapered shoulder adapted to fit said seat, and a projection constructed to carry a penetrator pointing toward said support; a pressure member; a minor load means normally yieldably holding said body and said pressure member slightly spaced apart; and a major load device adapted to cause the pressure member to press against the plunger member.

14. In a hardness tester, a movable test-piece support; a seat; a plunger member comprising an extension and a body adapted to carry a penetrator, the lower face of the body normally engaging said seat; a minor load means normally yieldably pressing on said body; a pressure member; a major load device to press the pressure member against the body; and an index control member and a guide means engaging the outer end portion only of said extension; said plunger member, minor load means and pressure member forming one assembly normally entirely out of contact with other structure except said seat, said index control member and said guide means.

15. In a hardness tester, a test-piece support; a head having a seat; means for effecting relative approach between said head and support; a plunger member comprising an extension having a rounded end, and a body adapted to carry a penetrator, the lower face of the body normally engaging said seat; pressure means for pressing on said body; an index lever fulcrumed on said head; an adjusting screw mounted in said lever and provided with a center recess resting on said rounded end; and a gauge provided with a plunger connected to the index lever.

16. In a hardness tester, a test-piece support; a testing head; means for causing relative approach between said support and head; a sleeve carried on the head and provided with a seat; a plunger member comprising a plunger extension and a body in said sleeve, the body engaging said seat only and constructed to carry a penetrator associated with said support; a bushing in said sleeve and disposed loosely on the extension substantially co-axial with the body; a minor load spring normally holding said body and bearing bushing apart; an intermediate member out of contact with said extension and having knife edge ends, one engaging the plunger body; a major load device adapted to press on the other knife edge end to press the bearing member against the body, the contacting faces between the upper end of said body and the lower end of the bushing being perpendicular to their axes; and a guide means engaging the outer end portion of said extension.

17. In a hardness tester, a test-piece support; a testing head; a plunger member movably carried by said head; minor load means bearing on said member; a major load device, including a power lever, adapted to press on said plunger member; a lifting lever pivoted to said head and terminating near the plunger member; and a link pivoted to the rear of said lifting lever and provided with a part engaging under the power lever; a spindle passing through said head under the forward part of the lifting lever; a handle crank fast on said spindle; and a crank arm fast on the spindle provided with a lifting pin engaged under the lifting lever, whereby to raise the lifting and power levers and hold them raised.

18. In a hardness tester, a test-piece support; a testing head; a plunger member movably carried by said head; minor load means bearing on said member; a major load device, including a power lever pivoted to the head, adapted to press on said plunger member; means including a lifting lever for raising the power lever; and a dash pot means to permit quick raising of the lifting lever and to retard its downward movement.

19. In a hardness testing machine, the combination of a frame comprising a base and head; an elevating test piece support mounted on said base; said frame having a vertical bore over said support; a plunger sleeve fast in said bore, and having a seat at its lower end; a plunger assembly in said sleeve comprising an upwardly pointed plunger rod and a lower plunger body slidable in said sleeve and having an annular taper adapted to sit on said seat, and a projection constructed to carry a penetrator over said support; a bushing slidable on said stem just above the plunger body; a minor load spring holding the plunger body and bushing somewhat spaced apart; a tubular member on said rod and provided at its ends with upper and lower knife edges, the lower edges resting on the bushing; a major load power lever disposed longitudinally of said head and pivoted at its front end pivoted to said head, the front end portion of the power lever resting on said upper knife edges of the tubular member without contact with said rod; and a major load weight hanging on the rear end of the power lever.

20. In a hardness tester, an elongated pressure transmitting member adapted to transmit pressure in the direction of its axis and engaged and supported solely by a bearing member, the extent of contact of which against said pressure transmitting member constitutes substantialy the periphery of a mathematical circle as distinguished from a cylindrical area of contact.

21. In a machine of the character described, a plunger member, a penetrator member and guide means, said machine being characterized in that throughout the testing operation the plunger member is guided by said guide means by direct contact only near that end of the plunger member which is remote from the penetrator member, said guidance being for only a minute length of the plunger member and all additional guidance tending to keep the plunger member from moving out of its original axis being furnished through the specimen itself contacting with the penetrating surface of the penetrating member.

22. In a machine of the character described, a plunger member, a penetrator member and guide means, said machine being characterized in that throughout the testing operation the plunger member is guided by direct contact only near that end of the plunger member which is remote from the penetrator member, said guidance being for only a minute length of the plunger member and all additional guidance tending to keep the plunger member from moving out of its original axis being furnished through the material, to be tested, itself contacting with the penetrating surface of the penetrating member, the plunger member, when the penetrator member is not engaged with said material, being held rigid near its penetrator end by the combined action of a force tending to move it axially in the direction of the penetrator and a pair of bearing surfaces, one of which forms a shoulder on the plunger near its penetrator end and the other forms a shoulder in the testing head of the machine adapted to fit said shoulder on the plunger.

23. A machine as in claim 22 characterized in that the contact between said shoulders is separated upon the application of the initial pressure between the penetrator and the material to be tested.

24. In a hardness tester having a head, a sleeve fixed therein and having a central bore terminating in a female conical portion, a plunger rod, a cylindrical plunger body on said rod and having a male conical portion adapted, when the major load is applied to said plunger rod, to engage the said female conical portion for supporting the plunger centrally and against lateral strains and for maintaining the cylindrical face of said plunger free from the walls of said central bore to eliminate friction.

25. In a hardness tester having a head; a sleeve fixed therein and having a conical shoulder, a plunger, an annular head thereon, said head being provided with a conical shoulder adapted to engage the conical shoulder of said sleeve, said head also having a diameter much less than the bore of said sleeve to avoid frictional contact, the engagement of said shoulders centering said plunger for proper operation and means for separating said shoulders before the major load is applied.

26. In a hardness tester, an elongated pressure transmitting member adapted to transmit pressure in the direction of its axis and provided at one end with an engagement part adapted for interengagement with a specimen to be tested, whereby pressure is exerted: and means engaging a small portion of said member remote from said engagement part and constructed to hold said portion against substantial lateral movement, and cooperating with the specimen when thus pressed upon by said engagement part to cause said means and specimen to constitute substantially the sole guide for guiding the member in the direction of its axis; and means for seating the active end portion of said member until said interengagement takes place.

27. In a tester as in claim 26, said seat and member being so arranged that said pressure causes the unseating of said member.

28. In a tester as in claim 26, said interengagement causing the unseating of said member; and a load means for causing said engagement part to press upon the specimen, simultaneously with said unseating.

29. In a tester as in claim 26, means for pressing a load upon said member in the direction of said specimen while the member remains seated.

30. In a tester as in claim 26, said member and seat being arranged to cause the moving of said member from the seat, to unseat the member, when the specimen is engaged and presses said engagement part in a direction toward the member, and means for pressing a predetermined load upon the member to move the member toward seating position.

31. In a tester as in claim 26, a load means against which said member is pressed by the unseating action of the specimen.

32. In a hardness tester, a pressure transmitting member adapted to carry an engagement part adapted during testing to be pressed upon a specimen to be tested; and means for supporting said member, when the testing load is applied, solely at its opposite ends; and means for seating the active end portion of the member before the engagement part is engaged, engagement of the engagement part by the specimen unseating said member.

33. In a hardness tester, an elongated pressure transmitting member adapted to carry a penetrator at one end; and a supporting means near the opposite end of said member; said member, when moved by the penetrator being guided solely by said penetrator and supporting means; and means for seating the active end portion of the member before the penetrator is engaged and moved by the test specimen, engagement of the penetrator by the specimen unseating said member.

34. In a hardness tester, an elongated pressure transmitting member adapted to transmit pressure in the direction of its axis and provided at one end with an engagement part adapted for interengagement with, and to be pressed upon, a specimen to be tested; means engaging only a portion of said member remote from said engagement part and constructed to hold said portion against substantial lateral movement and cooperating with the specimen when thus pressed upon by said engagement part to cause said means and specimen to constitute a guide for guiding the member in the direction of its axis; said means being constructed to permit lateral movement of said engagement part, when the member is not guided by the specimen; and means for seating the active end portion of the member before the engagement part is engaged, said interengagement unseating said member.

35. In a hardness tester, an elongated pressure transmitting member adapted to transmit pressure in the direction of its axis and provided at one end with an engagement part adapted for interengagement with a specimen to be tested whereby pressure is exerted; and means engaging a small portion of said member remote from said engagement part and constructed to hold said portion against substantial lateral movement, and cooperating with the specimen when thus pressed upon by said engagement part to cause said means and specimen to constitute substantially the sole guide for guiding the member in the direction of its axis; means for automatically applying a predetermined minor load to said member, when said pressure is exerted, for pressing the engagement part upon the specimen to cause small initial relative movement between said part and specimen; and means for applying a predetermined major load to said member after said minor load is applied for causing additional relative movement of the member toward the specimen.

36. In a tester as in claim 35, means operatively connected to the member for measuring said additional movement.

37. In a hardness tester, an elongated pressure transmitting member adapted to transmit pressure in the direction of its axis and provided at one end with an engagement part adapted to be pressed upon a specimen to be tested; and means engaging a small portion of said member remote from said engagement part and constructed to hold said portion against substantial lateral movement, and cooperating with the specimen when thus pressed upon by said engagement part to cause said means and specimen to constitute substantially the sole guide for guiding the member in the direction of its axis; a minor load means; means for causing relative movement of said member and a test specimen toward each other to cause interengagement and relative movement of the member in one direction toward the minor load means thereby to apply the minor load; means for applying a major load to said member after said minor load is applied for causing relative movement of the member toward the specimen in a direction opposite to said last named direction.

38. In a hardness tester an elongated pressure transmitting member adapted to transmit pressure longitudinally and carrying at one end a penetrator adapted to be pressed upon and penetrate a specimen to be tested; and means engaging a portion of said member remote from the penetrator to hold said portion against substantial lateral movement and cooperating with the specimen when thus pressed upon and being penetrated by the penetrator to cause said means and specimen to constitute the sole guide for the member in the direction of its axis; said means being constructed to permit limited lateral movement of the penetrator without binding the member, when the member is not guided by the specimen; means for applying a minor load to said member for pressing the engagement part upon the specimen; means for applying a major load to said member while said minor load is still applied for causing additional relative movement of the member toward the specimen.

39. In a hardness tester, a pressure transmitting member adapted to carry an engagement part adapted during testing to be pressed upon a specimen to be tested; and means for supporting said member, when the testing load is applied, solely at its opposite ends; means for automatically applying a minor load to said member for pressing the engagement part upon the specimen when movement of the specimen and said member toward each other takes place; and means for applying a major load to said member after said minor load has been applied for causing additional relative movement of the member toward the specimen.

40. In a hardness tester, an elongated pressure transmitting member adapted to carry a penetrator at one end; and a supporting means near the opposite end of said member; said member, when moved by the penetrator being guided solely by said penetrator and supporting means; means for automatically applying a minor load to said member for pressing the penetrator upon the specimen when said engagement takes place; and means for applying a major load to said member after said minor load has been applied for causing additional relative movement of the member toward the specimen.

41. In a hardness tester, an elongated pressure transmitting member adapted to transmit pressure in the direction of its axis and provided at one end with a penetrator adapted to be pressed upon and to penetrate a specimen to be tested; and means engaging only a portion of said member remote from said engagement part and constructed to hold said portion against substantial lateral movement, said means cooperating with the specimen when thus pressed upon and penetrated by said penetrator to cause said means and specimen to constitute substantially the sole guide for guiding the member in the direction of its axis; said means being constructed to permit lateral movement of said penetrator, when the member is not guided by said specimen; means for automatically applying a predetermined minor load to said member for pressing the engagement part upon the specimen; and means for applying a major load to said member after said minor load is applied for causing relative movement of the member toward the specimen.

Signed at New York in the county of Bronx and State of New York this twelfth day of April A. D. 1930.

CHARLES H. WILSON.

CERTIFICATE OF CORRECTION.

Patent No. 1,885,972.  November 1, 1932.

CHARLES H. WILSON.

It is hereby certified that error appears in the printed specification of the above numbered patent requiring correction as follows: Page 5, line 110, claim 9, strike out the syllable and words "ber having knife edge ends, one end engag-" and insert instead "tact therewith and having a shoulder"; and that the said Letters Patent should be read with this correction therein that the same may conform to the record of the case in the Patent Office.

Signed and sealed this 16th day of May, A. D. 1933.

M. J. Moore.

(Seal)  Acting Commissioner of Patents.